May 8, 1928.
R. J. WINSOR
1,669,364
TRACTOR EXTENSION FRAME
Filed May 7, 1923
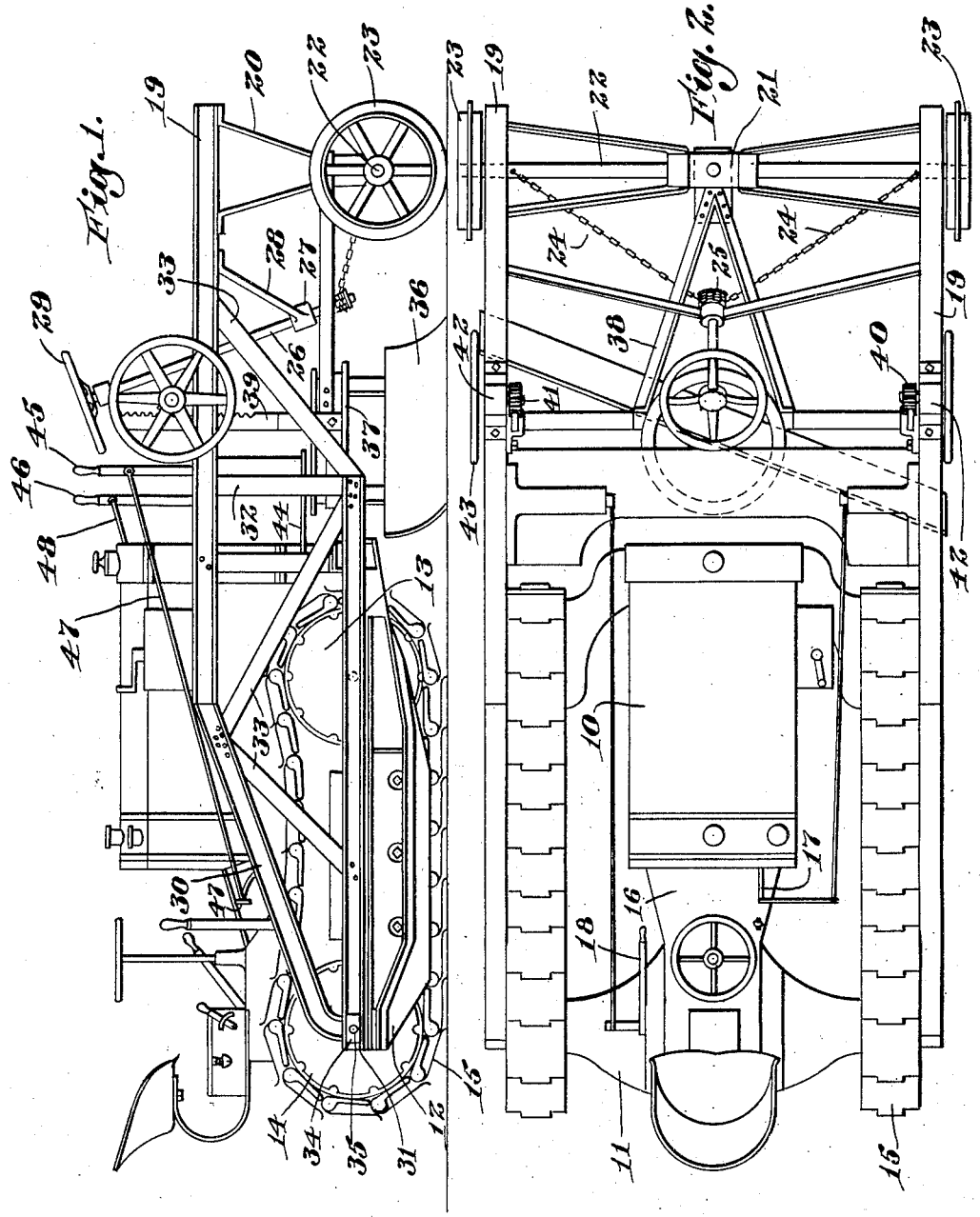
Inventor
Roy J. Winsor
by James R. Hodder
Attorney Patented May 8, 1928.

1,669,364

UNITED STATES PATENT OFFICE.

ROY J. WINSOR, OF BUCYRUS, OHIO.

TRACTOR EXTENSION FRAME.

Application filed May 7, 1923. Serial No. 637,319.

My present invention is a method or process of converting a tractor or tractor power plant into a road working machine, and consists also in a novel type of road working machine thus made.

Heretofore many well-known types of machines suitable for working on roads as graders, trimmers, road maintainers, scrapers, gutter builders and the like, as well as snow plows, have been built to be drawn by a team of horses, as well as by an automobile or tractor. Such road grading machines requiring at least one operator on the road machine and of course one or more operators for the tractor drawing it, as well as when a team of horses, often two to eight, were used as the pulling power. I have discovered that by the building of a road working machine, with the road operating or working implements in front of the power propelling automobile, tractor, or the like, and by properly combining the power plant and its driving mechanism with the road working devices, frame, etc., as well as forwardly supporting and guiding wheels of the road working frame, thus pushing the road vehicle in front of the driver, that I could so construct and arrange the entire apparatus as to permit the operation of the tractor or driving vehicle and the actuation of the road working implements, all under the control of one operator. Thus in effect I produce a "one man machine" with suitable means within the control of a single operator to effect the steering and guiding of the combined instrumentalities from the forwardly supporting and steering wheels of the road grading apparatus, together with the control of the self-propelled vehicle as the power plant at the rear. Furthermore, by novel means and arrangements I so unite the road working or grading apparatus with the power plant as to eliminate the danger of a mere pushing action, which might cause a buckling and distortion between the front of the power plant and the rest of the road working apparatus. My invention comprises means to connect the road grading part of the apparatus at the rear of the center of the power plant, thus securing the benefits of a thrusting or pushing of the power plant with the operating device in front and in view of the operator, simultaneously arranging for relative movement between the driving portion of the power plant and the road working portion of the apparatus, and thus constructing a complete successful machine under a one man control, and furthermore obtaining the advantages of the road grading or working devices travelling ahead of the power plant—a most important feature in rough road scraping, snow plow work and the like.

This feature of the thrusting and pushing of the road operating device from a point on the power plant at the rear of the center of gravity, is of special importance and I believe is a distinct novelty and I wish to claim the same broadly. Thus when my invention is utilized in connection with a tractor power plant of the track or "caterpillar" type, the connection between the frame giving the spacing, forwardly extending room to receive the road working devices, and the forwardly supporting and steering wheels, enables me to connect the frame and the power plant in a pivotal manner which will facilitate the separate rocking of the road grading apparatus relatively with the tractor power plant. When a tractor employing rear driving wheels is utilized, then the connection between the frame and power plant may be made directly on the rear driving shaft of the tractor, thus securing the thrust or driving action on a center which will eliminate any tendency of "buckling" between the power plant and frame.

A further important feature consists in the fact that I am enabled to eliminate all steering from the tractor power plant itself and rely upon the forward supporting and steering wheels of the road grading apparatus. Thus I greatly simplify the machine and utilize the power plant as the driving means only and the relatively long spacing of the road working frame-work or apparatus and the forwardly supporting and guiding wheels as the steering portion. This still further facilitates the one man control feature for both the steering, road working adjustments, and the clutch and lever operations for the tractor power plant.

I find it very advantageous to carry out my present invention by a method of converting a standard type of tractor, combining the same with a suitable framework which will carry the road working devices, forward steering wheels, etc., and which will greatly simplify the building of my apparatus wherein the road working devices are positioned ahead of the power plant and driven from the power plant by a thrusting or pushing action at a point centered, or rearwardly of the center, of the power plant. Thus I can utilize any of the present well known road grading machines and any of the well known types of tractor power plants. This method of converting a tractor and a road grader or road working device into a combined, complete unitary machine, obtaining the advantages of the one man control;—thrusting or pushing arrangements;—steering, of the power plant from the front wheels of the road grading apparatus;—etc., is readily accomplished. I believe that this converting process is also a distinct novelty and I wish to claim the same herein broadly.

In the accompanying drawing illustrating the preferred embodiment of my invention, Fig. 1 is a side elevation, and

Fig. 2 is a plan.

Referring to the drawing, 10 designates the power plant of a tractor, 11 the transmission and rear axle housing, these two members being supported on side frames 12. In the side frames and at each end thereof are rotatably mounted forward and rearward sprocket wheels 13 and 14 respectively, each pair of sprocket wheels carrying endless crawler type of belt 15 and by means of which the entire apparatus is propelled. 16 designates the steering wheel of the tractor, 17 the clutch lever, and 18 the gear lever.

I have illustrated, in connection with my invention, the ordinary road grading machine comprised essentially of side frames 19 spaced apart from each other in the usual manner, such side frames 19 having secured thereto and depending downwardly at the front end therefrom substantially V-shaped members 20 secured at their lower ends, the extreme rearward and lower end of which are secured to the rear end of lower side frame members 31 which extend forwardly on each side of the tractor and above the side frames 12 thereof to a point slightly in the rear of the steering wheel 29, the forward ends of these lower side frame members 31 being secured to depending members 32, the upper ends of which are secured to depending members 32, the upper ends of which are secured to the side frame members 19. Braces 33 are provided for giving rigidity to the frame members above described. The rear end of the lower side frame members 31 are provided with bearing blocks of boxes 34 that are rotatably mounted on the outer end of the rear axle 35 of the tractor or, should it be preferred, a shaft is mounted on the top face of the side frames 12 of the tractor and on the top face thereof on which the rear end of the lower side frame members 13 is pivotally mounted. With this construction, it is obvious that both the tractor mechanism and the road grading mechanism are each rotatably mounted with respect to each other about the rear axle or about the shaft mounted on the upper rear face of the side members 12 as an axis, such relative movement being, of course, in a vertical plane.

Mounted for vertical movement in the road grader frame is the usual road grader plow 36, such road grader plow 36 being attached to the lower end of a framework 37, prevented from rearward movement by the V-shaped frame 38 pivotally secured to the king pin of the grader and such frame has attached thereto at each side thereof vertically extending rack bars 39 which mesh with pinions 40 secured to the inner ends of shafts 41 each rotatably mounted in a bearing block 42 secured to each side frame member 19 and to the outer end of each of the shafts 41 is secured an adjusting hand wheel 43 and by means of which each end of the road grader plow 36 may be adjusted as regards height. At the rear of the steering wheel 29, adjusting wheels 43 and in front of the power plant 10 of the tractor is provided a platform 44 which is suspended from the side frame members 19 in any suitable manner. Control levers 45 and 46 are pivotally connected by means of the connecting rods 47 and 48 respectively to the various operating mechanisms, such as clutch 17 of the tractor, and by means of which the tractor may be controlled by the same person who controls steering of the entire apparatus and the adjusting of the road grader plow.

It is obvious from the above that, with the road grader combined with the tractor mechanism in the manner above described, I have successfully solved the problem of utilizing existing road grading machinery while dispensing with the necessity of utilizing horses or motor vehicles for dragging the same and that, by disconnecting such road grader apparatus from the tractor mechanism at the points 34 and 35, the tractor mechanism may be employed independently of the road grader for any other useful purposes. Also, it will be obvious that, while I have necessarily shown and described the preferred embodiment of my invention somewhat in detail, it is to be understood that I may vary the size, shape, and arrangement of parts comprising my improved apparatus within reasonably wide limits without departing from the spirit of the invention.

Having thus described my invention, what I claim as new is:

1. The combination with a tractor of the crawler type, of a frame structure provided with front guiding wheels, means for mounting said frame structure on a horizontal axis located on and at the rear of the tractor whereby the front end of the tractor and the front end of the frame have relative movement with respect to each other in a vertical plane about said axis, means mounted on said frame structure and in front of the tractor for controlling the guiding wheels, and means located in front of the tractor and connected with the control apparatus of the tractor for controlling the tractor from a point on the frame structure.

2. The combination with a tractor of the crawler type, of a frame structure, means for mounting said frame structure on a horizontal axis located on the tractor to permit relative movement between the tractor and the frame structure in a vertical plane about said axis, front guiding wheels mounted on said frame structure and widely spaced apart from the tractor, means mounted on said frame structure and in front of the tractor for controlling the guiding wheels, and means located in front of the tractor and connected with the control apparatus of the tractor for controlling the tractor from the point on the frame structure.

3. The combination with a tractor of the crawler type, of a frame structure, means for mounting the frame structure on a horizontal axis located at the rear of the tractor, whereby relative movement between the front end of the tractor and the frame structure is permitted in a vertical plane about said axis, front guiding wheels mounted on the frame structure and widely spaced apart from the tractor, an operator's position secured to the frame structure at a point between the front end of the tractor and the front guiding wheels, means mounted on the frame structure and operated from the operator's position for controlling the guiding wheels, and means connected with the apparatus of the tractor for controlling the tractor and operable from the operator's position.

In testimony whereof, I have signed my name to this specification.

ROY J. WINSOR.